(12) United States Patent
Vrljes et al.

(10) Patent No.: US 7,850,419 B2
(45) Date of Patent: Dec. 14, 2010

(54) BLEED VALVE ACTUATING SYSTEM FOR A GAS TURBINE ENGINE

(75) Inventors: Ljubisa Vrljes, Etobicoke (CA); Christopher Daniel Ongley, Mississauga (CA); Zoran Markovic, Georgetown (CA)

(73) Assignee: Pratt & Whitney Canada Corp., Longueuil, Québec (CA)

( * ) Notice: Subject to any disclaimer, the term of this patent is extended or adjusted under 35 U.S.C. 154(b) by 953 days.

(21) Appl. No.: 11/565,060

(22) Filed: Nov. 30, 2006

(65) Prior Publication Data
US 2008/0131266 A1 Jun. 5, 2008

(51) Int. Cl.
*F01D 17/00* (2006.01)
(52) U.S. Cl. .................. 415/145; 415/151
(58) Field of Classification Search ............ 415/144, 415/145, 151; 29/889.2; 60/785; 251/58, 251/62, 78, 291
See application file for complete search history.

(56) References Cited

U.S. PATENT DOCUMENTS

| | | | | |
|---|---|---|---|---|
| 2,727,732 A | * | 12/1955 | Plumb et al. | 366/285 |
| 2,943,407 A | * | 7/1960 | Long | 172/821 |
| 2,971,331 A | * | 2/1961 | Silverman et al. | 137/15.1 |
| 3,472,487 A | * | 10/1969 | Moellmann | 415/23 |
| 4,086,761 A | * | 5/1978 | Schaut et al. | 60/226.1 |
| 4,403,912 A | * | 9/1983 | Pekari et al. | 415/150 |
| 4,550,564 A | | 11/1985 | Callahan et al. | |
| 4,655,034 A | | 4/1987 | Kenison et al. | |
| 4,715,779 A | | 12/1987 | Suciu | |
| 5,174,545 A | | 12/1992 | Blais | |
| 5,380,151 A | | 1/1995 | Kostka et al. | |
| 5,477,673 A | | 12/1995 | Blais et al. | |
| 6,048,171 A | | 4/2000 | Donnelly et al. | |
| 6,122,905 A | | 9/2000 | Liu | |
| 6,161,839 A | | 12/2000 | Walton et al. | |
| 6,183,195 B1 | | 2/2001 | Tremaine | |
| 6,195,982 B1 | | 3/2001 | Gysling et al. | |
| 6,742,324 B2 | * | 6/2004 | Bachelder et al. | 60/204 |

* cited by examiner

*Primary Examiner*—Ninh H Nguyen
(74) *Attorney, Agent, or Firm*—Ogilvy Renault LLP

(57) ABSTRACT

The bleed valve actuating system is for use in a gas turbine engine. The system comprises an actuator mounted adjacent the engine case and having a main actuation axis extending generally parallel to a surface of the engine case. A drive rod extends from the bleed valve to the actuator generally perpendicularly with reference to the main actuation axis of the actuator. The drive rod connected to the actuator via a linkage mechanically connects the actuator to the drive rod. The linkage is configured to convert axial motion of the actuator along the main actuation axis into generally perpendicular motion of the drive rod.

17 Claims, 3 Drawing Sheets

BLEED VALVE ACTUATING SYSTEM FOR A GAS TURBINE ENGINE

TECHNICAL FIELD

The invention relates to a system and a method for actuating a bleed valve within a gas turbine engine.

BACKGROUND

Gas turbine compressor surge is typically regulated by bleed valves. Each bleed valve is typically operated using an actuator to which the movable bleed valve element is mechanically connected. While many arrangements have been suggested in the past to actuate the bleed valves, room for further improvements always exists.

SUMMARY

In one aspect, the present concept provides a gas turbine engine, the engine comprising a case surrounding a compressor bleed valve, the engine having a bleed valve actuating system including an actuator mounted adjacent the engine case and having a main actuation axis extending generally parallel to a surface of the engine case, a drive rod extending from the bleed valve to the actuator generally perpendicularly with reference to the main actuation axis of the actuator, the drive rod connected to the actuator via a linkage mechanically connecting the actuator to the drive rod, the linkage configured to convert axial motion of the actuator along the main actuation axis into generally perpendicular motion of the drive rod.

In another aspect, the present concept provides a bleed valve actuating system for a gas turbine engine, the system comprising: a rod partially extending inside a case of the engine and having an end projecting generally radially out of the engine case; a linear actuator having a fixed portion and a movable portion, the fixed portion being rigidly connected to a fixed structure of the engine, the actuator extending generally parallel to a surface of the engine case; a lever having opposite first and second ends, the first end of the lever being pivotally connected to the movable portion of the actuator and defining a first pivot axis; a bell crank having opposite first and second ends and a pivot point, the ends and the pivot point arranged relative to one another to define a triangle therebetween, the pivot point being pivotally connected to the fixed structure and defining a second pivot axis, the first end of the bell crank being pivotally connected to the second end of the lever and defining a third pivot axis, the second end of the bell crank being pivotally connected to the free end of the rod and defining a fourth pivot axis; wherein the first, second, third and fourth pivot axes are parallel, and wherein the linkage is configured to convert generally linear axial movement of the actuator into generally linear radial movement of the rod.

In a further aspect, the present concept provides a method of servicing a bleed valve of a gas turbine engine, the method comprising: providing a bleed valve system having an actuator pivotally connected to a bleed valve drive rod via a pivotal linkage, the linkage configured to convert linear movement of the actuator along the engine case into radial movement of drive rod radially through the engine case, the linkage mounted to the engine independently of a connection of the linkage to the actuator, the connection of the linkage to the actuator including a releasable pin connection; releasing the releasable pin connection; servicing the actuator; reconnecting the actuator to the linkage by restoring the releasable pin connection.

Further details of these and other aspects will be apparent from the detailed description and figures included below.

BRIEF DESCRIPTION OF THE FIGURES

For a better understanding and to show more clearly how it may be carried into effect, reference will now be made by way of example to the accompanying figures, in which.

DETAILED DESCRIPTION

Figure 1:
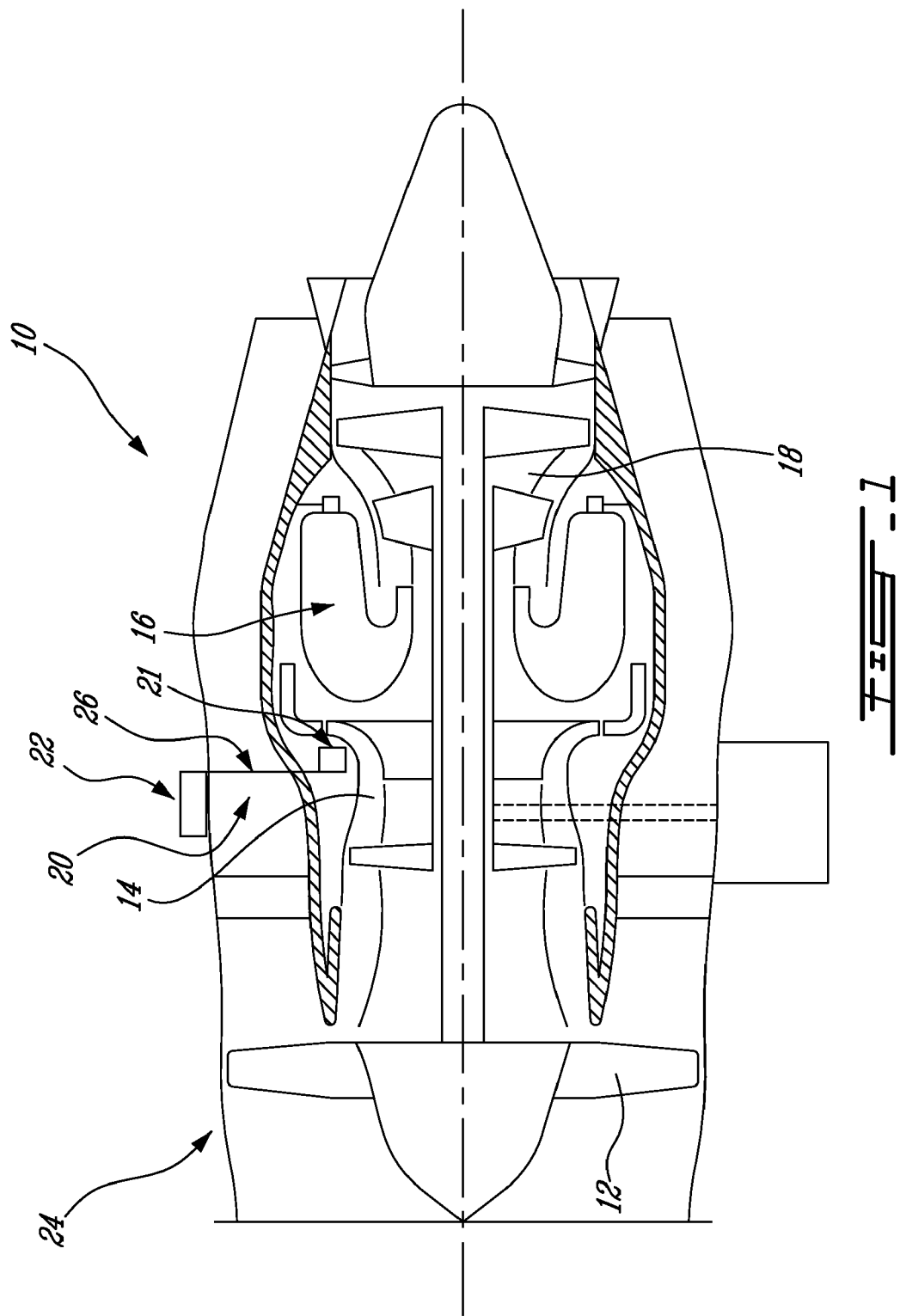
FIG. 1 schematically shows a generic turbofan gas turbine engine to illustrate an example of a general environment in which the improved bleed valve actuating system can be used.

FIG. 1 illustrates an example of a turbofan gas turbine engine 10 of a type preferably provided for use in subsonic flight, having an outer case 24 generally housing, in serial flow communication, a fan 12 through which ambient air is propelled, a multistage compressor 14 for pressurizing the air, a combustor 16 in which the compressed air is mixed with fuel and ignited for generating an annular stream of hot combustion gases and a turbine section 18 for extracting energy from the combustion gases. The compressor 14 includes a bleed valve actuating system 20, comprising a suitable bleed valve (or valves) 21, an actuator 22 and a generally radial drive rod 26 connecting the actuator 22 to the bleed valve 21. The engine 10 is an example of an environment in which the improved bleed valve actuating system 20 can be used, although any suitable gas turbine arrangement may be used. The exact construction of the bleed valve 21 does not form part of the present invention.

Figure 2:
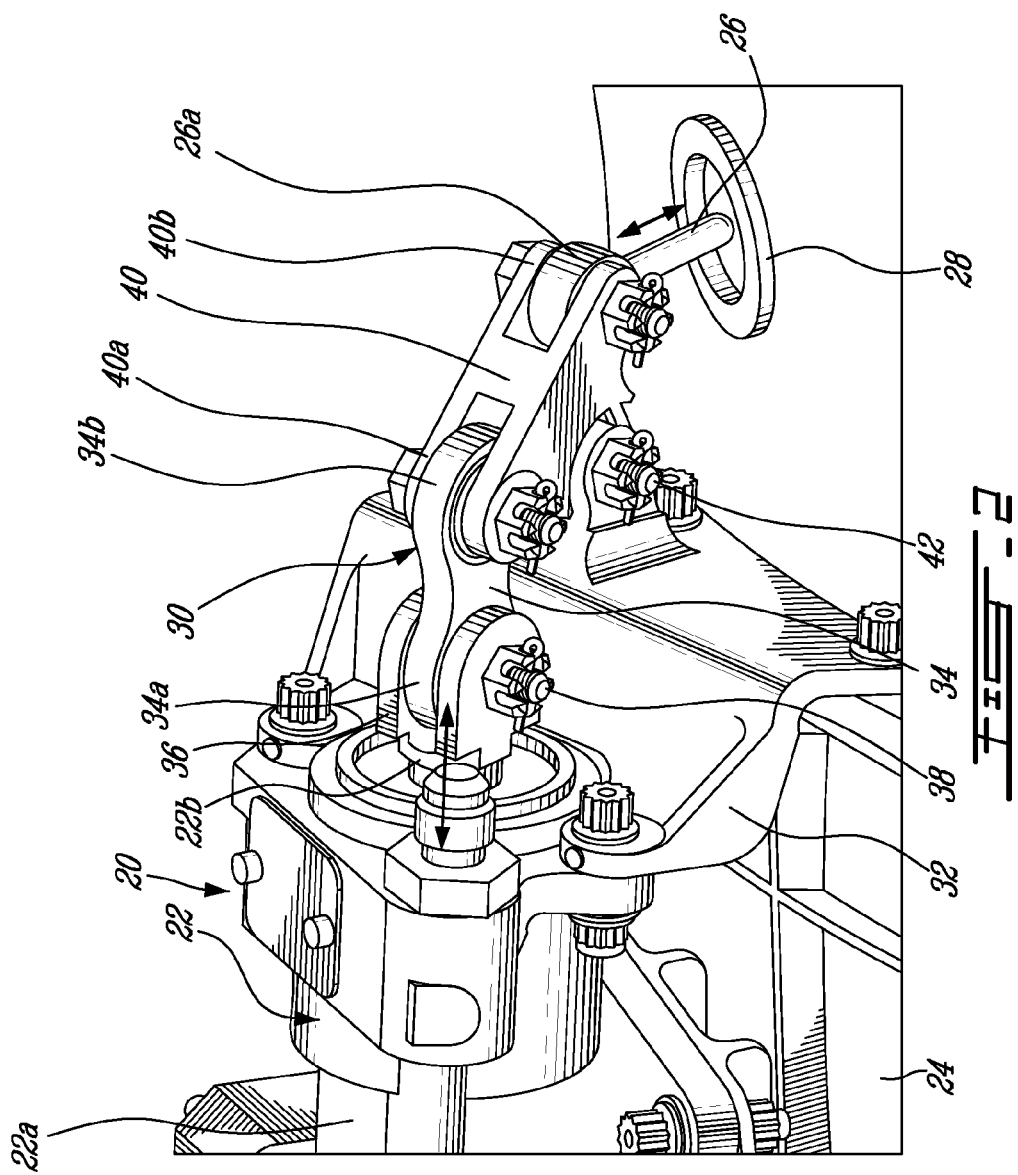
FIG. 2 is an isometric view of an example of an improved bleed valve actuating system.

FIG. 2 illustrates an enlarged view of the improved bleed valve actuating system 20 of FIG. 1. This system 20 is particularly well adapted for use with gas turbine engines having a low nacelle clearance environment, for instance engines that are relatively small in diameter. These engines have a small space between the engine case 24 and the interior of the nacelle (not shown) inside which the engine is provided. This space may not be wide enough for the actuator to be directly, radially mounted over the end of the radially-moving drive rod. Space may also be unavailable inside the engine case. Nevertheless, it has been found that one can provide the actuator parallel to the engine case in order to alleviate this problem.

In the illustrated example, the system 20 comprises an actuator 22 having a main axis extending substantially parallel to, or along, the outer surface the engine case 24, which is typically also parallel to the main shaft axis of the engine 10 (depicted in FIG. 1). The actuator 22 is preferably a linear actuator, such as a rod and cylinder type, in which its rod extends and retreats parallel to the main axis of the actuator 22. The operation of actuator 22 may be controlled by the electronic engine controller (not shown) or by another suitable device or means.

A drive rod 26 extends through a hole 28 in the engine case 24, to connect the actuator 22 to the bleed valve 21. The drive rod 26 is therefore generally radially oriented with reference to the main axis of the engine 10, though the angular orientation of the rod 26 needs not be exactly radial, but rather generally radially inwardly extending, relative to the actuator 22. The rod 26 has an end 26a projecting out of the engine case 24 through the hole 28 for connection to the actuator 22, and the opposite end within the engine case 24 is operatively attached to the bleed valve 21 (not shown in FIG. 2). For purposes of this description, it is to be assumed that movement of the drive rod 26 generally along its central axis actuates movement of the bleed valve 21. The operation of the drive rod 26 and the suitable bleed valve 21 will be understood by the skilled reader, and need not be discussed further here.

The actuator 22 and the drive rod 26 are mechanically connected using a linkage 30, such as a bell crank type linkage, which converts the actuator's axial (relative to the engine main axis) movement into a generally radial movement of the drive rod 26. The linkage 30 has a driving end and a driven end. The driving end is driven by the actuator 22 and the driven end is connected to the drive rod 26.

The actuator 22 has a fixed portion 22a and a movable portion 22b, which movable portion 22b is (in this example) attached to a piston (not shown) inside the actuator 22. The fixed portion 22a, in this case the cylinder, is rigidly connected to a fixed structure of the engine 10, for instance the engine case 24 by a suitable bracket arrangement. Referring still to FIG. 2, the linkage 30 includes a lever 34 having opposed first and second ends 34a, 34b. The first end 34a of the lever 34 is pivotally connected to a clevis 36 mounted on the movable portion or rod 22b of the actuator 22 by a bolt 38, and the pivot connection defines a first pivot axis. A nut and cotter pin complete the subassembly.

The linkage 30 has a second member, such as a bell crank 40 in this example, having a first end that is pivotally connected to the lever 34. The bell crank 40 has opposed first and second ends 40a, 40b, and a pivot point preferably laterally offset from an imaginary line drawn between the first end 40a and the second end 40b. The pivot point 42 is pivotally connected to a fixed structure, for instance the engine case 24, either directly, or as in this case, by a bracket 32 to which the fixed portion (i.e. cylinder) 22a of the actuator 22 is also connected. This way, the distance between the pivot point 42 of the bell crank 40 and the cylinder 22a of the actuator 22 is fixed, and may be maintained very accurately, from one installation to another, as will be described further below. The first end 40a of the bell crank 40 is pivotally connected to the second end 34b of the lever 34 by a bolt 38, with nut and cotter pin. The second end 40b of the bell crank 40 is pivotally connected to the free end 26a of the rod 26 also by a bolt 38, with nut and cotter pin. All the connection points define pivot axes that are all preferably parallel.

As mentioned, the bell crank 40 is movable about pivot 42 in a first partial circular path, over a given angular range. The second end 40b of the bell crank 40 is the driven end and is movable in a second circular path having a tangential resultant at the driven end that is substantially perpendicular to the linear path of the actuator rod 22b over the angular range of the bell crank 40. An actuating force exerted in a first direction is then mechanically transferred by the linkage from the first direction to a second direction, which second direction is substantially perpendicular to that first direction, and vice-versa.

In use, as the actuator rod 22b driving extends generally axially relative to the actuator 22 and engine axes (from viewer's left to right in FIG. 2), the lever 34 moves correspondingly in the same general direction, driving rotation of the bell crank 40 about pivot 42 (clockwise relative to FIG. 2). Such rotation of the bell crank 40, causes the connected drive rod 26 to be driven generally radially inwardly, thereby actuating (or de-actuating, as the case may be) the bleed valve (not shown) accordingly, as desired. Likewise, conversely, retraction movement of the actuator rod 22b pulls lever 34, and thus bell crank 40, to radially retract drive rod 26 generally outwardly relative to the engine, thereby de-actuating (or actuating, as the case may be) the bleed valve (not shown) accordingly, as desired. Axial (relative to the engine) movement of the actuator thus drives radial movement of the drive rod 26, thus alleviating the need for a radially-acting actuator. The lever 34 accommodates the movement mismatch between the linear movement of the actuator, and the angular movement of the bell crank. In other linkage or actuator arrangements, the lever 34 may not be required, or a different lever element may be required, and/or a lever element may be desired/required between the bell crank and the drive rod 26. The example linkage arrangement is preferred; however, the skilled reader will understand that other suitable linkage arrangements could be substituted.

Figure 3:
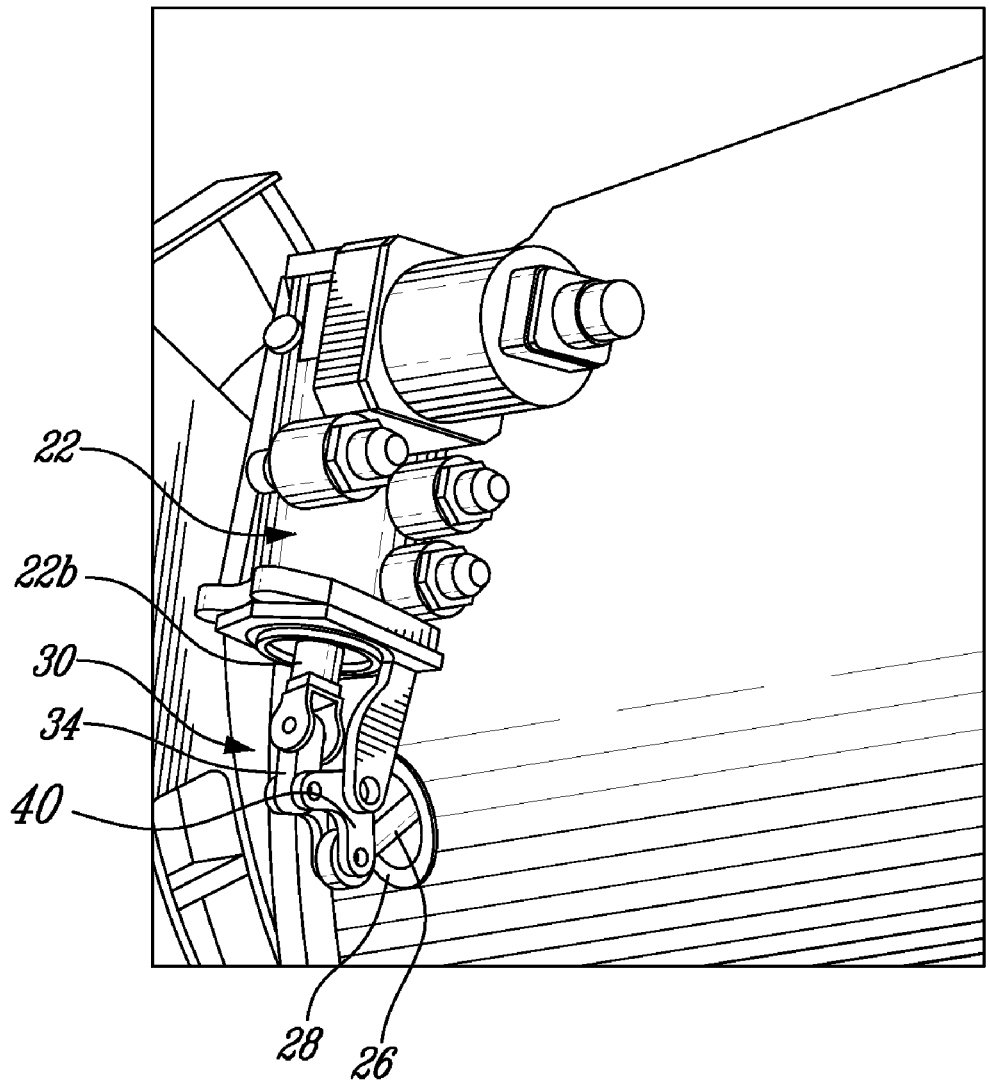
FIG. 3 is an isometric view similar to FIG. 2 of another example of an improved bleed valve actuating system.

The orientation of the actuator 22, alongside the engine case 24, takes less space, among other things. Also, since the actuator is not connected directly to the drive rod 26, the actuator may be removed and replaced without the need to recalibrate the bleed valve assembly, thereby speeding line servicing of the engine. The above description is meant to be exemplary only, and one skilled in the art will recognize that other changes may also be made to the embodiments described without departing from the scope of the invention disclosed as defined by the appended claims. For instance, the present invention is not limited to the linkage as exactly illustrated herein, and any suitable linkage arrangement may be used. The various elements can have shapes and proportions that vary in accordance with the needs. The actuator of the system is not necessarily parallel to the main longitudinal axis of the engine. The actuator can be perpendicular or otherwise positioned with reference to the main longitudinal axis of the engine, as depicted in FIG. 3, in which the actuator 22 is shown aligned generally circumferentially relative to the engine. The drive rod 26 need not necessarily be perpendicular to the main engine axis. The main axis of the actuator and the drive rod need not necessarily be perpendicular to one another. The actuator need not be a rod and cylinder, but may be any suitable linearly-extending actuation apparatus. A plurality of actuators, and/or drive rods, and/or bleed valves may be used, as desired. Also, the gas turbine engine shown in FIG. 1 is only one example of an environment where bleed valve actuating systems can be used. They can also be used in turbofan gas turbine engines having other configurations and sizes, and in other kinds of gas turbine engines, such as turboprop and turboshaft engines. Still other modifications which fall within the scope of the present invention will be apparent to those skilled in the art, in light of a review of this disclosure, and such modifications are intended to fall within the appended claims.

What is claimed is:

1. A gas turbine engine, the engine comprising a case surrounding a compressor bleed valve, with the compressor bleed valve being inside the case, the engine having a bleed valve actuating system including an actuator mounted outside of and adjacent to the engine case and having a main actuation axis extending generally parallel to a surface of the engine case, a drive rod extending from the bleed valve through the engine case to the actuator generally perpendicularly with reference to the main actuation axis of the actuator, the drive rod connected to the actuator via a linkage mechanically connecting the actuator to the drive rod, the linkage configured to convert axial motion of the actuator along the main actuation axis into generally perpendicular motion of the drive rod.

2. The gas turbine engine as defined in claim 1, wherein the linkage comprises a member pivotally connected to the engine case.

3. The gas turbine engine as defined in claim 2, wherein the member is pivotally connected to the engine case through a bracket connected to the actuator.

4. The gas turbine engine as defined in claim 1, wherein the main actuation axis of the actuator is substantially parallel to a main shaft axis of the engine.

5. The gas turbine engine as defined in claim 1, wherein the main actuation axis of the actuator is aligned generally circumferentially relative to the engine.

6. The gas turbine engine as defined in claim 1, wherein the drive rod is substantially radially aligned relative to the engine.

7. The gas turbine engine as defined in claim 1, wherein the actuator is pivotally bolted to the linkage.

8. The gas turbine engine as defined in claim 1, wherein the actuator comprises a rod and cylinder, the rod pivotally connecting to the linkage.

9. The gas turbine engine as defined in claim 1, wherein the linkage comprises a bell crank pivotally mounted to the engine.

10. The gas turbine engine as defined in claim 9, wherein the linkage further comprises a lever pivotally connecting the bell crank to the actuator.

11. A bleed valve actuating system for a gas turbine engine, the system comprising:
    a rod partially extending inside a case of the engine and connected to a bleed valve inside the case of the engine, the rod having an end projecting generally radially out of the engine case;
    a linear actuator having a fixed portion and a movable portion, the fixed portion being rigidly connected to a fixed structure of the engine, the actuator extending generally parallel to a surface of the engine case;
    a lever having opposite first and second ends, the first end of the lever being pivotally connected to the movable portion of the actuator and defining a first pivot axis;
    a bell crank having opposite first and second ends and a pivot point, the ends and the pivot point arranged relative to one another to define a triangle therebetween, the pivot point being pivotally connected to the fixed structure and defining a second pivot axis, the first end of the bell crank being pivotally connected to the second end of the lever and defining a third pivot axis, the second end of the bell crank being pivotally connected to the free end of the rod and defining a fourth pivot axis;
    wherein the first, second, third and fourth pivot axes are parallel, and wherein the linkage is configured to convert generally linear axial movement of the actuator into generally linear radial movement of the rod.

12. The system as defined in claim 11, wherein the fixed structure is an external portion of the engine case.

13. The system as defined in claim 11, wherein the pivot point is connected to the external portion of the engine case through a bracket.

14. The system as defined in claim 11, wherein at least one of the connections providing the first and second pivot axes is a bolt and nut assembly configured to permit selective detachment of the actuator from a remainder of the system.

15. A method of servicing a bleed valve of a gas turbine engine, the method comprising:
    positioning a bleed valve inside an engine case with a bleed valve drive rod passing through the engine case to have an end projecting outside the engine case;
    providing a bleed valve system having an actuator pivotally connected to the bleed valve drive rod via a pivotal linkage, the linkage configured to convert linear movement of the actuator along the engine case into radial movement of the drive rod radially through the engine case, the linkage mounted to the engine independently of a connection of the linkage to the actuator, the connection of the linkage to the actuator including a releasable pin connection outside the engine case;
    releasing the releasable pin connection from outside the case;
    servicing the actuator by removing the actuator from outside the engine case;
    reconnecting the actuator to the linkage by restoring the releasable pin connection from outside the case.

16. The method as defined in claim 15, wherein the step of servicing the actuator includes replacing the actuator with a replacement actuator.

17. The method as defined in claim 15, further comprising putting the engine back into flight service without re-calibration of the bleed valve.

* * * * *